(12) United States Patent
Suk et al.

(10) Patent No.: US 6,549,378 B2
(45) Date of Patent: Apr. 15, 2003

(54) MAGNETIC DISK DRIVE WITH OFFSET LOAD/UNLOAD TAB

(75) Inventors: Mike Suk, San Jose, CA (US); Donald Ray Gillis, San Jose, CA (US)

(73) Assignee: Hitachi Global Storage TEchnologies Netherlands B.V., Amsterdam (NL)

( * ) Notice: Subject to any disclaimer, the term of this patent is extended or adjusted under 35 U.S.C. 154(b) by 25 days.

(21) Appl. No.: 09/764,764

(22) Filed: Jan. 16, 2001

(65) Prior Publication Data

US 2002/0093769 A1 Jul. 18, 2002

(51) Int. Cl.[7] ................................................. G11B 5/54
(52) U.S. Cl. ...................................................... 360/255
(58) Field of Search ............................... 360/255, 254.7

(56) References Cited

U.S. PATENT DOCUMENTS

| | | | |
|---|---|---|---|
| 4,939,611 A | 7/1990 | Connolly | 360/128 |
| 5,237,472 A | 8/1993 | Morehouse et al. | 360/105 |
| 5,239,431 A | 8/1993 | Day et al. | 360/98.08 |
| 5,486,964 A | 1/1996 | Morehouse et al. | 360/105 |
| 5,585,980 A * | 12/1996 | Boutaghou | 360/255 |
| 5,757,587 A | 5/1998 | Berg et al. | 360/105 |
| 5,796,551 A | 8/1998 | Samuelson | 360/103 |
| 5,930,079 A | 7/1999 | Vera et al. | 360/104 |
| 5,995,330 A | 11/1999 | Furay et al. | 360/105 |
| 6,032,352 A | 3/2000 | Furay et al. | 29/603.03 |
| 6,292,333 B1 * | 9/2001 | Blumentritt et al. | 360/254.8 |

* cited by examiner

*Primary Examiner*—Robert S. Tupper
(74) *Attorney, Agent, or Firm*—Robert B. Martin

(57) ABSTRACT

The present invention is a magnetic disk drive for reading or writing magnetically, comprising: (i) a base; (ii) one or more magnetic disks; (iii) a hub fixedly attached to the disk(s) for supporting the disk(s); (iv) a motor operable to rotate the hub; (v) a plurality of magnetic read/write heads, each associated with the surface of a disk; (vi) one or more actuators for supporting the heads and moving the heads across the disks, each actuator having a load/unload tab at its distal end adjacent to the inner diameter side of the actuator; and (vii) a load/unload structure for displacing the heads from the disk comprising a plurality of ramps.

3 Claims, 3 Drawing Sheets

MAGNETIC DISK DRIVE WITH OFFSET LOAD/UNLOAD TAB

BACKGROUND OF THE INVENTION

1. Field of the Invention

The present invention relates generally to magnetic disk drives with load/unload ramps and, more particularly, to the load/unload tab on the distal end of the actuator

2. Description of the Background Art

A magnetic disk drive storage device typically comprises one or more thin film magnetic disks, each having at least one data recording surface including a plurality of concentric tracks of magnetically stored data, a spindle motor and spindle motor controller for supporting and rotating the disk(s) at a selected RPM, at least one read/write transducer or "head" per recording surface formed on a slider for reading information from and writing information to the recording surface, a data channel for processing the data read/written, a positionable actuator assembly for supporting the transducer in close proximity to a desired data track, and a servo system for controlling movement of the actuator assembly to position the transducer(s) over the desired track(s).

Each slider is attached on one surface to an actuator arm via a flexible suspension and includes on an opposite side an air bearing surface (ABS) with an aerodynamic pattern of protrusions on the air bearing surface which enable the slider to fly at a constant height close to the disk during operation of the disk drive. The aerodynamic pattern generally includes a pair of rails, one on each side of the slider. In contact start/stop disk drive designs, the slider and transducer are only in contact with the recording surface when the spindle motor is powered down. As the disk begins to rotate, an air flow is generated which enters the slider's leading edge and flows in the direction of its trailing edge. The air flow generates a positive pressure on the ABS, lifting the slider above the recording surface. As the spindle motor reaches operating RPM, the slider is maintained at a nominal fly height over the recording surface by a cushion of air. Then at spin-down, fly height drops until the slider is once again in contact with the disk.

Because contact start/stop recording subjects the slider and transducer to extensive wear, recent disk drive designs alternatively employ load/unload technology. According to this design, a ramp is provided for each slider/suspension assembly at the inner or outer diameter of the disk where the slider is parked securely while the spindle motor is powered down. During normal operation, the disk speed is allowed to reach a selected RPM (which may be below the normal operating RPM) before the head is loaded onto the disk from the ramp on the air cushion generated by the disk's rotation. In this manner, the slider flies over the disk without significant contact with the disk surface, eliminating contact start/stop wear.

U.S. Pat. No. 5,572,387 discloses a head suspension assembly for use with a magnetic disk drive having a load/unload ramp. FIG. 2D shows an actuator with load tang 18 centered at the distal end of the actuator. The load/unload ramp is generally positioned so that the edge of the ramp overlies a portion of the outer diameter of the disk. During unloading, the actuator is moved radially to the outer diameter of the disk where tang contacts the ramp to move the actuator away from the disk.

Integral Corporation sold a disk drive where the load/unload tang was offset to the outer diameter side of the actuator arm so that the edge of the ramp could be positioned at the edge of the disk thereby enabling the use of the entire disk for storage. Also, this design avoided the problem of particles falling from the ramp surface onto the disk.

Unfortunately, it has been discovered that during load and unload, the slider will, on occasion, inadvertently contact the disk with one or both of the rails causing loss of data. The problem is significant enough so that most users now avoid using for storage the outer diameter of the disk near the edge of the ramp.

Therefore, there is still a need in the art for a load/unload scheme that enables the use of more of the disk area for storage.

It is the object of the present invention to provide a load/unload scheme that enables the use of more of the disk area for storage.

Other objects and advantages will be apparent from the following disclosure.

SUMMARY OF THE INVENTION

The present invention relates to a magnetic disk drive for reading or writing magnetically, comprising: (i) a base; (ii) one or more magnetic disks; (iii) a hub fixedly attached to the disks for supporting the disks; (iv) a motor operable to rotate the hub; (v) one or more magnetic read/write heads supported on one or more sliders, each associated with the surface of a disk; (vi) one or more actuator assemblies for supporting the sliders and moving the sliders radially across the disks from the hub to the outside diameter of the disk, each actuator assembly having a top side and an opposite bottom side which faces the disk and an inner diameter side which faces the hub and an opposite outer diameter side; each actuator assembly having a tab positioned at its distal end and adjacent to the inner diameter side of the actuator assembly; and (vii) a load/unload structure attached to the base and positioned near the outer diameter of the disk for displacing the one or more heads from the disk, the load/unload structure comprising a one or more ramps for receiving the tabs of the actuator assemblies.

A more thorough disclosure of the present invention is presented in the detailed description of the invention, which follows, and the accompanying figures.

DETAILED DESCRIPTION OF THE PREFERRED EMBODIMENTS

Figure 1:
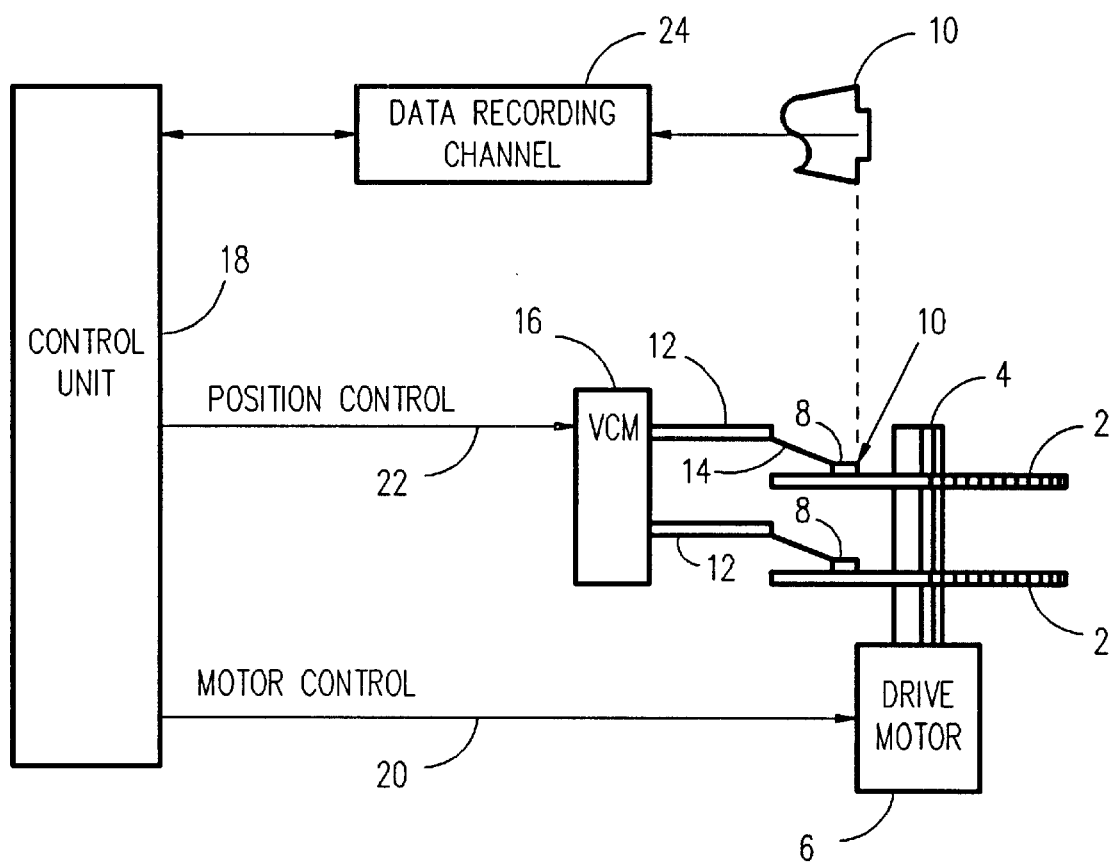
FIG. 1 is a schematic diagram of a magnetic disk storage system useful for the present invention.

Referring to FIG. 1, a magnetic disk storage system comprises one or more rotatable magnetic disks 2 supported on a spindle or hub 4 and rotated by a disk drive motor 6 with sliders 8 positioned adjacent the disks. The sliders each support one or more magnetic read/write transducers 10, commonly referred to in the art as read/write heads.

The magnetic recording media on each disk is in the form of an annular pattern of concentric data tracks (not shown) on disk 2. As the disk rotates, the slider is moved radially or along an arcuate path over the disk surface so that the head 10 may access different portions of the disk where desired data is recorded.

Each slider 8 is attached on its upper surface to an actuator body 12 by means of a suspension arm 14. The suspension provides a slight spring force which biases the slider against the disk surface. Each slider also has an aerodynamic pattern of protrusions on the air bearing surface facing the disk which enable the slider to fly at a constant height close to the disk during operation of the disk drive. A suitable aerodynamic pattern includes a pair of rails, one on each side of the slider such as disclosed in U.S. Pat. No. 5,777,825, the disclosure of which is incorporated herein by reference. Other aerodynamic patterns will be known to those skilled in the art. The actuator 12 is attached to a rotary actuator 16. The rotary actuator as shown in FIG. 1 may be a voice coil motor (VCM), for example.

The various components of the disk storage system are controlled in operation by control signals generated by control unit 18, such as access control signals and internal clock signals. Typically, the control unit 18 comprises logic control circuits, storage means and a microprocessor, for example. The control unit 18 generates control signals to control various system operations such as drive motor control signals on line 20 and head position and seek control signals on line 22. Read and write signals are communicated to and from read/write head by means of recording channel 24.

Figure 2:
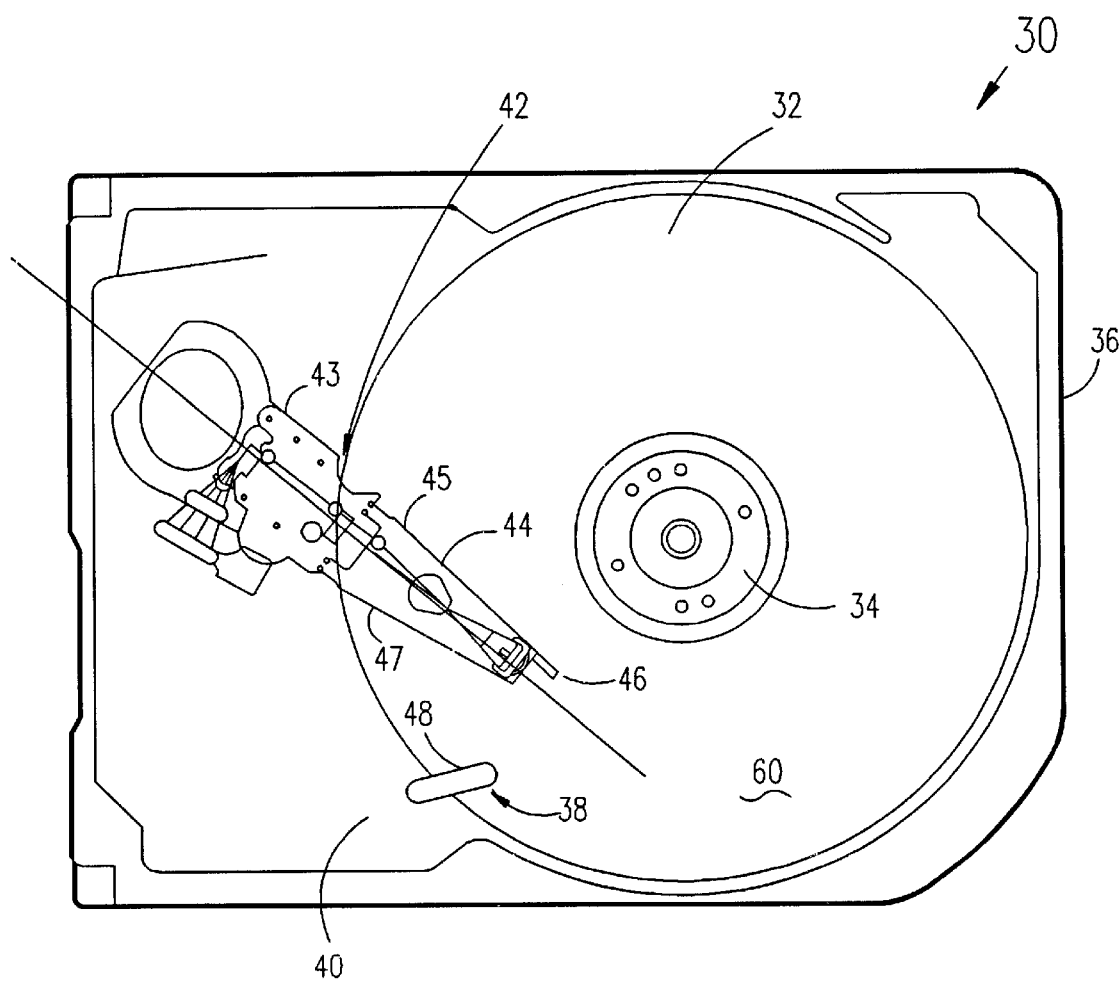
FIG. 2 is a top view of an embodiment of a magnetic storage system of the present invention.

Referring to FIG. 2, there is shown a disk drive 30 having a disk 32 comprising a thin film magnetic recording disk attached to spindle or hub 34 enclosed in housing 36. Load/unload structure 38 is fixedly secured to the base plate 40 of the housing of the disk drive and positioned at the outer perimeter of disk 32 preferably overlapping a portion of the disk. Rotary actuator assembly 42 comprises an actuator body 43 and suspension arm 44 supporting a slider adjacent to a disk. The actuator has an inner diameter side 45 facing hub 34, an outer diameter side 47 facing away from the hub 34 and a center line 60 running the length of the actuator assembly. The actuator arm suitably has a protrusion or tab 46 at its distal end for engaging a ramp 48 of the load/unload structure 38 during load/unload operations. The load/unload tab is offset from center of the actuator assembly (e.g. center line 60 does not pass through the center of tab 46) and preferably adjacent to the inner diameter side 45 of the actuator assembly 42 more preferably aligned with actuator suspension arm 44 as shown in FIG. 2.

Figure 3:
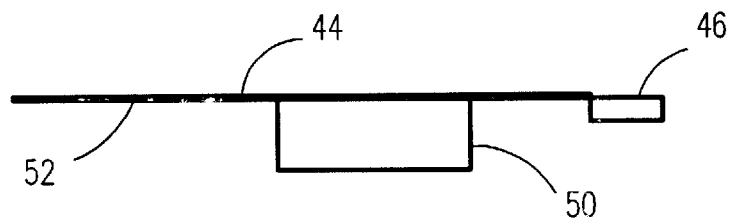
FIG. 3 is a side view of the front of the suspension.

Referring to FIG. 3, there is shown a side view of suspension arm 44. Slider 50 and load/unload tab 46 are suitably attached to the bottom side 52 of suspension arm 44 which faces the disk during operation of the disk drive.

Figure 4:
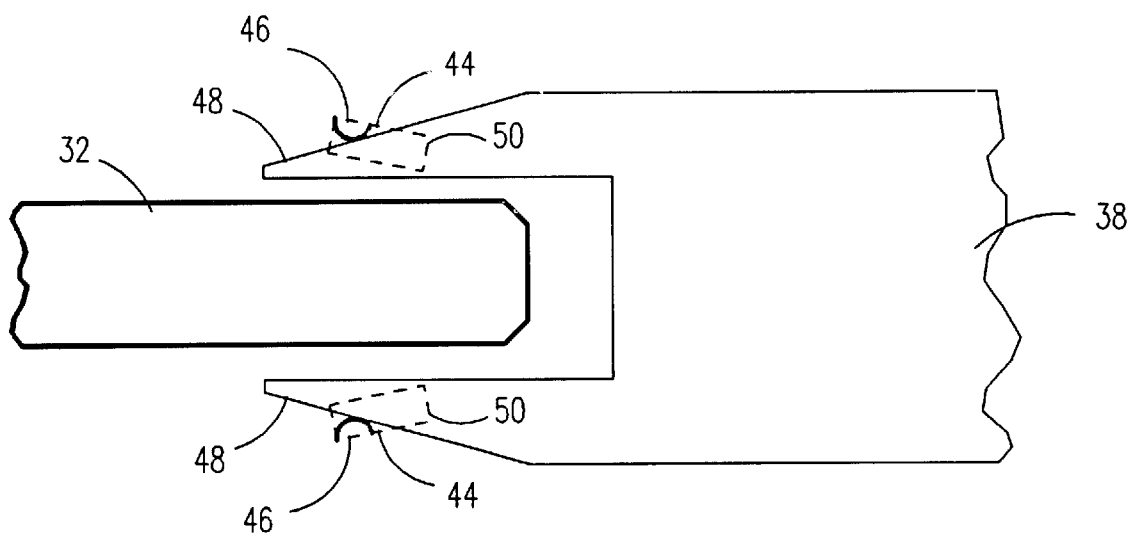
FIG. 4 is a side view of the unloading of the suspension onto the ramp.

Referring to FIG. 4, there is shown a side view of the actuator being unloaded from the disk 32 onto the load/unload structure 38. During unloading, the actuator is moved radially across the disk away from the hub 34 until tab 46 contacts ramp 48. Because the tab 46 is aligned with the inner diameter of the suspension 44, the suspension will be twisted slightly as it moves on the ramp so that the outer diameter side of the slider 50 (shown with broken lines) will be tilted towards the disk 32. The suspension is twisted because the normal spring force of suspension arm 44 causes twisting of the suspension around the offset tab 46.

The suspension is also twisted during unloading of the actuator onto the disk. Because of the twist in the suspension, if there is any inadvertent contact between the slider and the disk, the contact will be forced to occur with the outer diameter side of the slider and therefore the potential contact area will be limited to a circumferential area closest to the outside diameter of the disk. Therefore, the user will be able to use more of the disk area because less of the outer diameter of the disk will be resevered for inadvertent contact with the slider.

Although the present invention has been described with respect to preferred embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention as defined by the appended claims, in which references to an element in the singular is not intended to mean "one and only one" unless explicitly so stated but rather "one or more" Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phase "means for."

We claim:

1. A magnetic recording device for reading or writing magnetically, comprising:

(i) a base;

(ii) a magnetic disk comprising a substrate and a magnetic layer;

(iii) a hub fixedly attached to the disk for supporting the disk;

(iv) a motor attached to the base and operable to rotate the hub;

(v) a magnetic read/write head supported on a slider associated with the surface of a disk;

(vi) an actuator for supporting the slider and moving the slider across the disk from the hub to the outside diameter of the disk, the actuator having one end pivotally attached to the base, a top side and an opposite bottom side facing the disk, an inner diameter side facing the hub, an opposite outer diameter side and a centerline between the inner and outer diameter side; the actuator having a tab at its distal end extending away from the pivotally attached end of the actuator and offset from the centerline of the actuator towards the inner diameter side of the actuator;

(vii) a load/unload structure attached to the base at the outer periphery of the disk for displacing the head from the disk comprising a ramp for receiving the tab of the actuator.

2. The magnetic recording device of claim 1 wherein the tab is adjacent the inner diameter side of the actuator.

3. The magnetic recording device of claim 1 wherein the tab is aligned with the inner diameter side of the actuator.

* * * * *